Oct. 27, 1931.  R. B. SPIKES  1,828,753
METHOD AND APPARATUS FOR OBTAINING AVERAGE SAMPLES
AND TEMPERATURE OF TANK LIQUIDS
Filed July 31, 1929
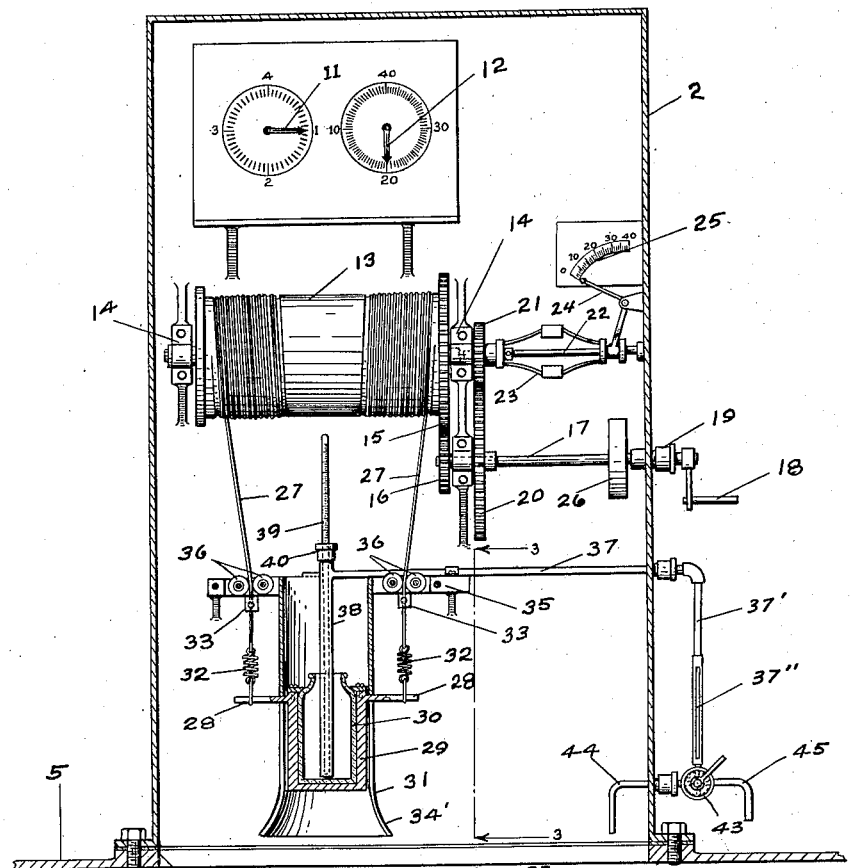

Patented Oct. 27, 1931

1,828,753

UNITED STATES PATENT OFFICE

RICHARD B. SPIKES, OF SAN FRANCISCO, CALIFORNIA, ASSIGNOR, BY MESNE ASSIGNMENTS, TO ROSCOE E. JORDAN, OF ALAMEDA COUNTY, CALIFORNIA

METHOD AND APPARATUS FOR OBTAINING AVERAGE SAMPLES AND TEMPERATURE OF TANK LIQUIDS

Application filed July 31, 1929. Serial No. 382,511.

This invention relates to apparatus for sampling liquids stored in tanks, particularly oil in large storage tanks, and the objects of the invention are to provide apparatus by which an average sample of the liquid may be obtained and/or the average temperature of the liquid. Also such apparatus which may be easily installed on top of existing oil storage tanks and which may be operated in sealed relation to outer atmosphere so that pressures and gases will be retained within the tank and danger of causing possible explosions will be eliminated. Other objects appear in the following specification and annexed drawings.

The depth of oil in large storage tanks may reach forty feet or more at some times, yet at other times the level within the tank may be quite low, and the problem of determining the average temperature of the oil from top to bottom and/or obtaining a sample of oil from the tank which will represent the average of the oil contained regardless of level, has been found difficult to solve heretofore, and my apparatus is adapted to simplify such work and is adaptable to any liquids stored in tanks of any size.

With reference to the drawings, Fig. 1 is an elevation showing my apparatus housing secured to the top of a storage tank, a portion only of the tank being shown.

Fig. 2 is an enlarged vertical section of the housing showing my apparatus therein and with portions of the apparatus shown in section.

Fig. 3 is a still further enlarged drawing of a portion of Fig. 2 as seen from the line 3—3 thereon.

In further detail the drawings show an oil storage tank 1 with a sheet metal housing 2 tightly bolted over an opening 3 formed in the top 5 of the tank. The housing is air or gas tight (when used on tanks containing liquids such as oils which emit volatile constituents) and it is preferably provided with a removable manhole plate 6 having glass panels or portholes 7, 8, 9 for viewing the readings of the apparatus, and additional glazed viewing openings may be provided on the housing as at 10 for further observations of the enclosed mechanism without the necessity of opening any part of it during the operations of sampling.

Included within the housing 2 may be the reading graduations or dials respectively of a water depth gage 11 and an oil depth gage 12 from which the height of the oil and depth of the layer of water under the oil may at all times be readily ascertained and the actual depth of the oil column determined by simple subtraction. The depth gages are operated by common floats or depth gage mechanisms not involved in the present invention and therefore not shown in the drawings.

Also within the housing is a winding drum 13 rotatably mounted on supporting brackets 14 and geared down by gears 15, 16 to a shaft 17 projecting through the side of the housing and fitted with a hand crank 18. The shaft passes through a stuffing box at 19 so that air or other gas under pressure will not escape from within the housing, and secured to the shaft is a large gear 20 driving a small pinion 21 secured to a speed indicator shaft 22 revolvably supported, in the present showing, in line with the drum axis, tho not necessarily so.

The speed indicator may be of any suitable design, but is here shown as in the form of a weighted centrifugal governor 23 arranged to rock a lever 24 having one end movable along an index 25 at various speeds of shaft 22, the graduations being given a value to be presently explained.

To assist an operator to maintain an even speed of rotation to crank 18 it is desirable that gear wheel 20 be quite heavy or that an additional balance wheel 26 be mounted on shaft 17.

Drum 13 is preferably scored right and left and provided with winding ropes or chains 27 secured to a cross arm 28 on a bottle holder 29 preferably a weighted cup-like device in which a sampling bottle or receptacle 30 is securely placed and which may be lowered to the bottom of the tank and lifted to the position shown by operating the drum.

When in the elevated position shown, the bottle holder is positioned within a downwardly flaring or funnel-like chute 31 slotted at the sides and in which slots the cross arms 28 are seated. Springs 32 are preferably interposed in the rope connections to the bottle carrier so that the bottle or receptacle will be brought to definite position when raised without danger of injury to the parts, tho additional stops may be secured to the ropes as at 33 if desired.

The slots in the sides of the chute are designated 34 and are also flared open at the bottom as at 34' for certain entry of the cross arm 28 in raising the receptacle.

Chute 31 is rigidly supported on bracket 35 which also carries two sets of grooved idlers 36 which align the ropes from that point downward so as to insure the cross arm 28 always coming up in position to enter the slots in the guiding chute or funnel.

Also supported by the bracket 35 is a sampling tube or pipe 37 which passes air tight through the wall of the housing and is provided with a vertical run 38 of somewhat increased diameter projecting downward into the open receptacle 30 to terminate with its lower open end close to the bottom of the receptacle, while within the vertical tube 38 is a thermometer 39 bearing such graduations at its upper portion as have any value in the temperatures to be determined. This thermometer passes through a sealed joint at 40 so that the contents of the receptacle 30 may be drawn off through tube 37, and the upper or reading end of the thermometer is positioned adjacent the window 7 of the housing, it being desirable to provide a "windshield wiper" 41 against the inside of the glass operated from without by a handle 42, having an axle passing through a packed hole, so that any sweat can be wiped from the inside of the window without opening the same or the leaking of gas from within.

The windows over the depth gages and speed indicator do not require a wiper as they may be positioned quite close to the glass, but the position of the receptacle 30 makes it necessary for the stem of the thermometer to be further from its window so that sweat might interfere with the reading.

Withdrawing tube 37 is connected outside the housing with a vertical tube 37' having a three-way valve 43 with one lead 44 returning air tight to discharge into the tank, and the other lead 45 to discharge in the open for drawing off the sample from receptacle 30. A sight tube 37" forms part of the tube 37' so that the start of liquid therethrough may be observed and the valve 43 thrown either way as may be desired.

In operating the apparatus, to fill the receptacle 30 with an average sample it is required that the hoist be operated to lower the receptacle to the bottom of the oil strata and lift it again at such a speed that the receptacle will have about become filled, or better not quite filled when returned to position shown with tube 38 and the thermometer projecting into the receptacle. Hence the speed of operating the hoist both ways is important, for if the oil is many feet deep it is manifest the receptacle must be lowered and raised at a much greater speed than if the tank is but partially full in order to have substantially the same amount in the receptacle, therefore the hoist speed indicator 24 may be conveniently graduated in figures denoting the actual depth of the oil column positioned at the points of speed which will substantially fill the receptacle with oil of such depth when the hoist is operated at the speed indicated, also, as the water layer below the oil should not be included in the sample the receptacle should stop just before reaching it and to this end the dimensions of the hoist parts are preferably such that each revolution of the crank 18 lowers or raises the receptacle one foot, so that with a known actual depth of the oil strata as ascertained from the gages 11 and 12 with due allowance for the known elevation of recepticle above the oil at start, the crank may be revolved at a speed to bring the indicator 24 to the mark thereon which was predetermined as being correct for the bottle or receptacle used.

When the receptacle with its oil is raised, the thermometer enters together with tube 38 as shown in Fig. 2 so that the temperature of the average sample and hence the average temperature of the tank contents may readily be observed through window 7, and, if it is desired to withdraw the sample, valve 43 is turned to open pipe 45 and the low gas pressure usually in the tank will force the contents of the receptacle through pipes 38, 37 for ejection, tho if it is desired to merely empty the receptacle back into the tank valve 43 is kept open to pipe 45 until the flow just starts as seen in glass 37", then quickly thrown over to open pipe 44 and the siphoning action will drain the receptacle into the tank, it being understood that the difference in head is sufficient to maintain the siphoning action.

If there is a lack of gas pressure in the tank to start the flow suction may be applied to the end of pipe 45 by any convenient means such as a large rubber bulb, small portable pump, or even with the mouth and a rubber tube connection until the flow is seen at 37".

Having thus described my invention it will be seen to be susceptible of many variations in detail without changing the general mode of operation, and any such changes as come within the spirit of the invention are intended to be covered in my appended claims.

I claim:

1. In apparatus of the character described, a receptacle, means arranged for lowering and raising the receptacle in a tank of liquid so as to get a sample of the liquid, means for gaging the speed of lowering in relation to the depth of liquid.

2. In apparatus of the character described, a receptacle, means arranged for lowering and raising the receptacle in a tank of liquid so as to get a sample of the liquid, means for gaging the speed of lowering and raising in relation to the depth of liquid.

3. In apparatus of the character described, a receptacle, means arranged for lowering and raising the receptacle in a tank of liquid so as to get a sample of the liquid, means for automatically applying a thermometer to the liquid in the receptacle when same is raised.

4. In apparatus as specified in claim 3 a housing covering the apparatus and the lowering and raising means being operable from without the housing.

5. In apparatus of the character described, a receptacle, means arranged for lowering and raising the receptacle in a tank of liquid so as to get a sample of the liquid, means for automatically applying a thermometer to the liquid in the receptacle when same is raised, a housing enclosing the apparatus provided with a window arranged for viewing the thermometer readings.

6. In apparatus of the character described, a housing adapted for positioning on top of a storage tank, a receptacle within the housing, means for lowering and raising the receptacle in the tank for obtaining a sample of the liquid, and means for determining the temperature of said sample while within the housing.

7. In apparatus of the character described, a housing adapted for positioning on top of a storage tank, a receptacle within the housing, means for lowering and raising the receptacle in the tank for obtaining a sample of the liquid, means for determining the temperature of said sample while within the housing and means for draining the receptacle back into the tank.

8. In apparatus of the character described, a housing adapted for positioning on top of a storage tank, a receptacle within the housing, means for lowering the receptacle into the tank and raising the receptacle back to position in the housing, and means for withdrawing the liquid from the receptacle including a discharge outside and inside of the housing.

9. In apparatus of the character described, a housing adapted for positioning on top of a storage tank, a receptacle within the housing, means for lowering the receptacle into the tank and raising the receptacle back to position in the housing, and means for withdrawing the liquid from the receptacle including a pipe branched to discharge to the outside and inside of the tank, and valve means for controlling either discharge.

10. In apparatus of the character described, a sealed housing adapted for positioning on top of a storage tank, a receptacle within the housing, means for lowering the receptacle into the tank and raising the receptacle back to position in the housing, and means for withdrawing the liquid from the receptacle, and a thermometer positioned in said housing adapted to enter said receptacle when same is raised.

11. In apparatus of the character described, a sealed housing adapted for positioning on top of a storage tank, a receptacle within the housing, means for lowering the receptacle into the tank and raising the receptacle back to position in the housing, and means for withdrawing the liquid from the receptacle, and a thermometer positioned in said housing adapted to enter said receptacle when same is raised, a window in said housing adjacent said thermometer, and an externally operated internal wiper on said window.

12. In apparatus of the character described, a sealed housing adapted for positioning on top of a storage tank, a receptacle within the housing, means for lowering the receptacle into the tank and raising the receptacle back to position in the housing, and means for withdrawing the liquid from the receptacle, and the receptacle lowering means including a hoist within the housing, flexible devices extending from the hoist to the receptacle, and a downwardly directed funnel-shaped guide for aligning said receptacle when raised.

13. In apparatus of the character described, a sealed housing adapted for positioning on top of a storage tank, a receptacle within the housing, means for lowering the receptacle into the tank and raising the receptacle back to position in the housing, and means for withdrawing the liquid from the receptacle, and the receptacle lowering means including a hoist within the housing, flexible devices extending from the hoist to the receptacle, means for operating said hoist from outside of said housing, and means indicating the speed of said hoist.

14. In apparatus of the character described, a sealed housing adapted for positioning on top of a storage tank, a receptacle within the housing, means for lowering the receptacle into the tank and raising the receptacle back to position in the housing, and means for withdrawing the liquid from the receptacle, and said last mentioned means including a pipe extending out of the housing and having a branch extending down into said receptacle when raised, and a thermometer extending into said branch for gaging the temperature of the contents of the receptacle.

RICHARD B. SPIKES.